June 9, 1942.   E. E. CLINE   2,285,392
PIPE LINE STOPPER
Filed May 15, 1940   3 Sheets-Sheet 1

Inventor
Earl E. Cline.
By Cushman, Darby, & Cushman
Attorneys

June 9, 1942.    E. E. CLINE    2,285,392
PIPE LINE STOPPER
Filed May 15, 1940    3 Sheets-Sheet 2
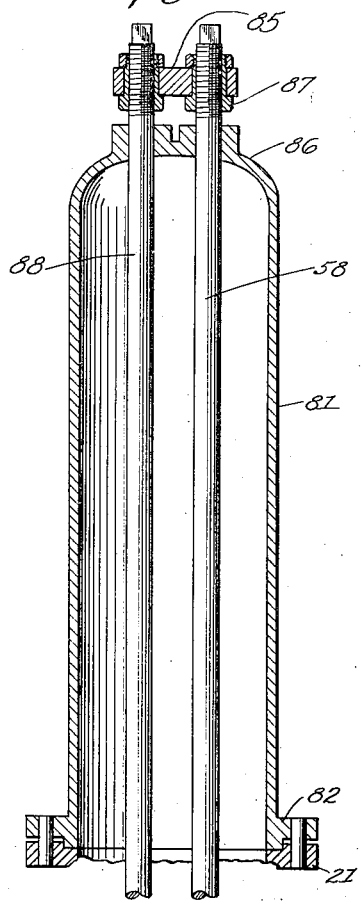
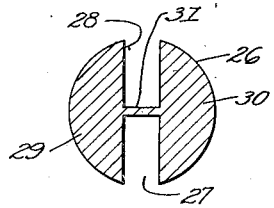
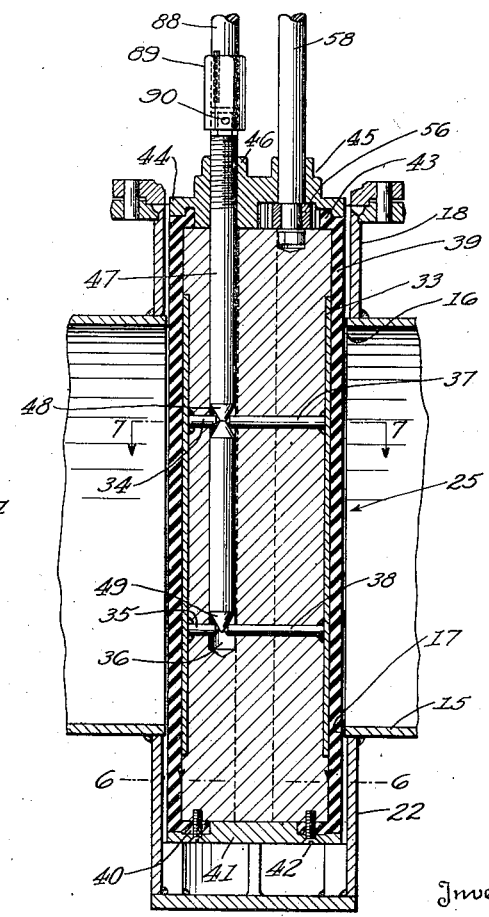
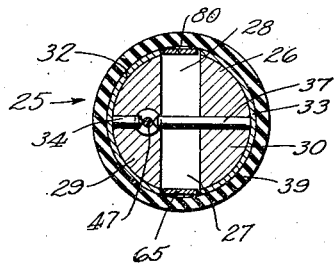
Inventor
Earl E. Cline.
By Cushman, Darby, Cushman
Attorneys June 9, 1942.  E. E. CLINE  2,285,392
PIPE LINE STOPPER
Filed May 15, 1940   3 Sheets-Sheet 3
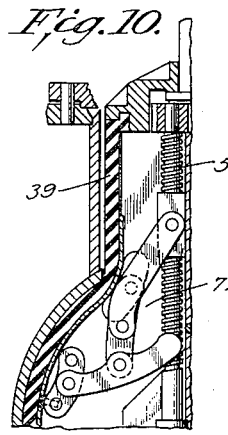
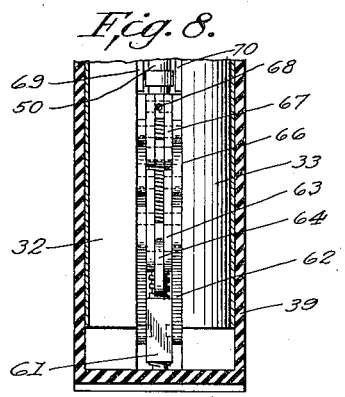
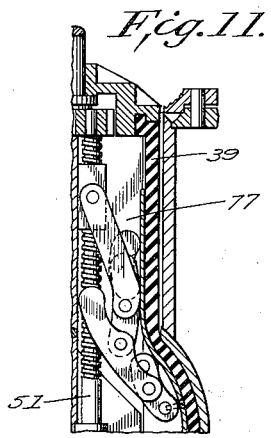
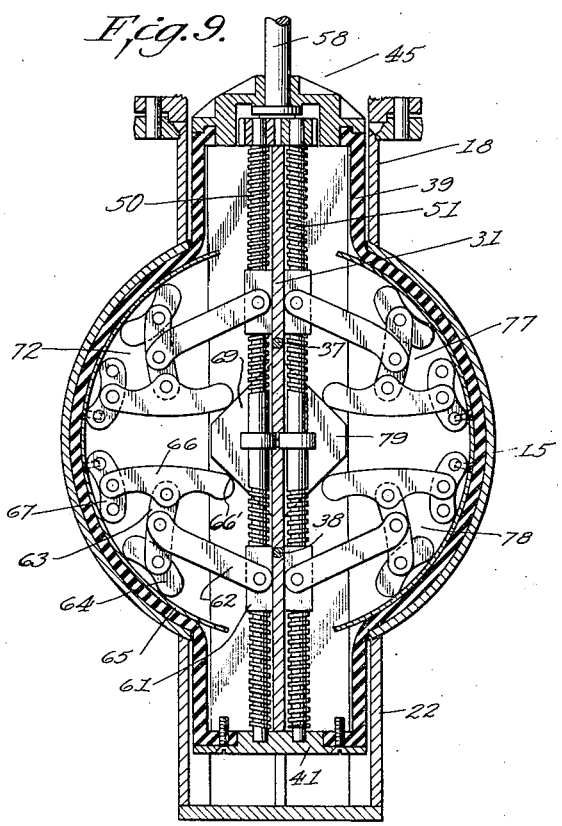
Inventor
Earl E. Cline
Attorneys Patented June 9, 1942

2,285,392

UNITED STATES PATENT OFFICE 2,285,392

PIPE LINE STOPPER

Earl E. Cline, Decatur, Ill., assignor to Mueller Co., Decatur, Ill., a corporation of Illinois Application May 15, 1940, Serial No. 335,407

14 Claims. (Cl. 138—94)

This invention relates to pipe line stoppers and has as a main purpose to provide a stopper which may be inserted in a main and powerfully expanded to completely seal the main against flow. Although not necessarily confined to any particular mode of use, since it may be variously adapted, the new stopper may be designed for use in a system wherein the main is provided with opposed side wall openings through which the stopper is inserted. A purpose of the invention is to provide a stopper which will not only block the main transversely but will also seal such side wall openings. Another and important purpose of the invention is to provide a stopper suitable for mains of relatively large size and which will accommodate itself to widely varying internal pipe diameters.

In the accompanying drawings I have shown the invention in typical embodiment and I shall now refer to these drawings in describing the invention. In the drawings:

Figure 4 is a section of the barrel of Figure 1 taken at right angles to the plane of the latter figure;

Figure 5 is a section of the parts shown in Figure 2 but taken at right angles to the plane of the latter figure;

Figure 6 is a section on line 6—6 of Figure 5;

Figure 7 is a section on line 7—7 of Figure 5;

Figure 8 is a section on line 8—8 of Figure 2;

Figure 9 is a section like that of Figure 2 but showing the stopper in expanded relation;

Figure 10 is a partial section like that of Figure 9 showing the stopper in association with a pipe of smaller diameter; and Figure 11 is a partial section like that of Figure 9 but showing the stopper in association with a pipe of still smaller diameter.

Figure 1:
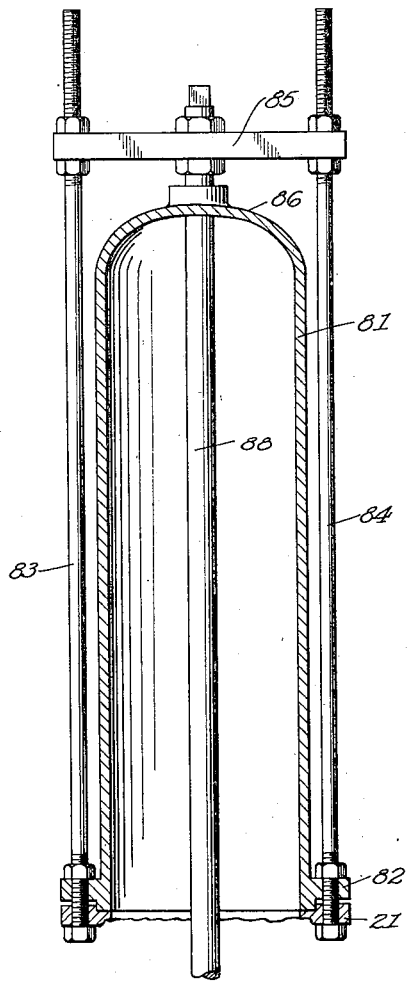
Figure 1 is an axial section of a barrel forming part of the new apparatus.

Referring first to Figures 1 to 9, reference numeral 15 designates a main having top and bottom openings 16 and 17 formed therein. The top opening is surrounded by a fitting 18 which has a flange 19 adapted to be bolted to the lower flange 20 of a gate valve housing whose upper flange is designated by the reference numeral 21, Figures 1 and 4. The lower opening 17 is surrounded by a fitting 22 which includes an end closure 23 on which are mounted several blocks 24 which provide a seat for the stopper generally designated by the reference numeral 25. Fittings such as 18 and 22 and the manner of forming the openings in the main are described, for example, in Patent No. 2,171,576, granted September 5, 1939, to T. A. Larry.

The stopper 25 comprises a cylindrical core 26 which is provided with diametrically opposite longitudinally extending slots 27 and 28 so that the core is divided into opposite portions 29 and 30 of segmental section joined by a central web 31.

The core portions 29 and 30 are relieved intermediate their ends to provide recesses which receive arcuate mandrels 32 and 33 which embrace the portions 29 and 30 betweeen slots 27 and 28. Mandrel 32 has radial pins 34 and 35 secured thereto and slidable in radial bores in portion 29, these bores intersecting an axially extending bore 36. Mandrel 33 has secured thereto radial pins 37 and 38 which are slidable in the core in co-axial relation, respectively, with pins 34 and 35. The ends of all the pins project within the bore 36.

Figure 3:
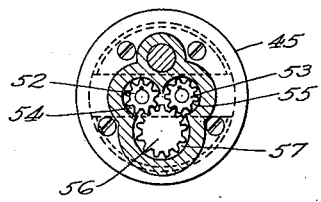
Figure 3 is a section on line 3—3 of Figure 2.

Surrounding the core and the mandrels is a heavy cylindrical rubber sleeve 39 having a bottom flange 40 engaged between the bottom of the core 26 and a bottom cap 41 by screws 42. The sleeve has a top flange 43 which has a clincher engagement with a flange portion 44 of a top cap 45 which is secured against the top of the core 26 by screws as shown in Figure 3.

Threaded in a boss 46 of cap 45 on an axially extending axis is a shaft 47 which extends within bore 36 with a running fit. Shaft 47 is reduced to provide a conical cam surface 48 cooperable with the ends of pins 34 and 37, the lower extremity of the rod being provided with a conical cam surface 49 similarly cooperable with the ends of pins 35 and 38. The normal position of these parts is shown in Figure 5 wherein the mandrels are held retracted by the sleeve 39. The outside diameter of the sleeve is slightly less than the diameter of openings 16 and 17 so that the stopper is readily insertable to the position shown in Figures 2 and 5.

Positioned in slots 27 and 28 respectively is a pair of shafts 50 and 51, the shafts extending along the sides of web 31. The lower ends of the shafts 50 and 51 are journalled in the bottom cap 41, Figures 2 and 9, while their upper ends have fixed thereon pinions 52 and 53 which are rotatably received and guided in intersecting cavities 54 and 55 in the top of the cap 45. These pinions serve as journals for the upper ends of the shafts. They mesh with a pinion 56 which is rotatably received and guided in a cavity 57 in the cap 45, this cavity intersecting cavities 54 and 55. Pinion 56 is fixed on the lower end of a shaft 58 which is journalled in and projects upwardly from the cap 45, the shaft having a thrust collar 58' just below the top wall of the cap. Shafts 50 and 51 are formed centrally with fixed collars 59 and 60 which have bearing in shallow arcuate recesses in web 31. The opposite end portions of the shafts are oppositely threaded.

Figure 2:
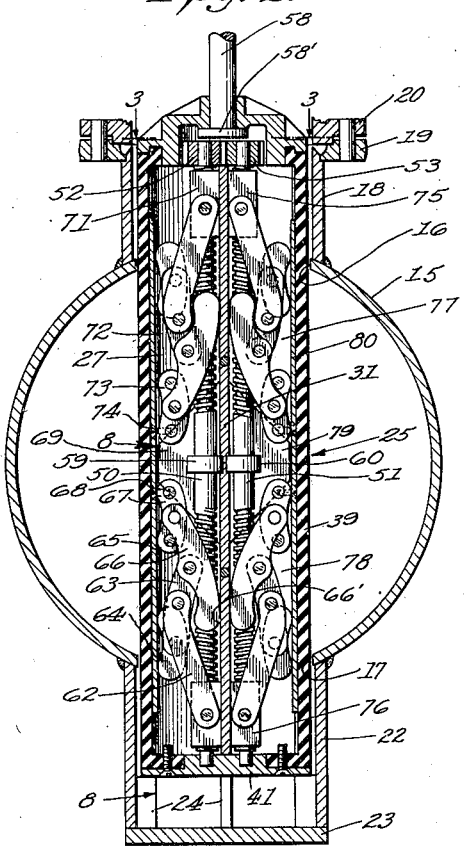
Figure 2 shows in axial section a stopper according to the invention, the stopper being shown in normal or contracted relation across a main which is shown in cross section.

The lower threads of shaft 50 are engaged by a square nut 61 which upon rotation of the shaft is slidable along web 31 and is prevented by the latter from turning. Pivoted on trunnions on nut 61, Figures 2 and 8, are the parallel arms of a link or thrust member 62 whose other slightly curved ends are pivoted to the central portion of the parallel arms of a link 63, the link 63 being disposed within the arms of link 62. Pivoted centrally between the lower ends of the arms of link 63 is a presser foot 64 which has a concave outer face providing two points of contact with a flat spring 65 which rests against the inner surface of the rubber sleeve in slot 27 of the core 26.

The upper end of link 63 is pivoted centrally between the arms of a link 66 whose upper end is pivoted centrally to a second presser foot 67 shaped like foot 64 and bearing against spring 65, the upper portion of the foot being secured to the spring by a screw 68. As shown in Figures 2 and 8, the upper inner portions of the arms of link 66 are adjacent or against the lower inclined edges of wedge or cam plates 69 and 70 which are secured against the side walls of the slot 27 midway between the ends of the core and in the planes of the link arms. The lower end of the link 66 is adjacent or against the surface of web 31.

The upper threaded end of shaft 50 is engaged in a square nut 71 which has pivoted thereto a linkage unit exactly the same as the unit just described, and similarly disposed with reference to upper inclined edges of the wedge plates, this linkage, generally designated by the reference numeral 72, having a terminal presser foot 73 secured by a screw 74 to the spring 65. Shaft 51 has engaged therewith square nuts 75 and 76 which have pivoted thereto linkage units 77 and 78 exactly like the unit first described and similarly associated with wedge plates in groove 28, one of these plates being shown in Figure 2 and being designated by the reference numeral 79. The terminal presser feet of units 77 and 78 are secured to a flat spring 80 disposed in slot 28. In Figure 2 it is assumed that the main 15 is of about the largest size to which the stopper will accommodate itself. The stopper is so supported on the blocks 24 and its parts are so related that the top portions of the topmost presser feet are within the top opening 16 while the lowermost portions of the lowermost presser feet are within the opening 17.

Reference numeral 81 designates a barrel having a bottom flange 82 secured to flange 21 of the gate valve housing by means of nuts threaded on the lower ends of upwardly projecting rods 83 and 84 on whose upper threaded ends is supported a cross head 85 between top and bottom nuts. Shaft 58 projects upwardly through a packed bearing in the top wall 86 of the barrel 81 and has tightly threaded on its projecting extremity a bushing 87 which is rotatably received in a bearing in the cross head 85. The bushing is formed with top and bottom shoulders which prevent axial displacement of the bushing and shaft 58 relative to the cross head. Similarly associated with the cross head is a shaft 88 which has a bearing in the top wall of the barrel and at its lower end has a spline connection with a coupling sleeve 89 which has a lower hexagonal socket in which is engaged the hexagonal upper extremity of shaft 47. The coupling is secured to shaft 47 by a set screw 90. Shafts 58 and 88 have squared extremities engageable by a turning tool.

With the stopper positioned as shown in Figures 2 and 5, the mandrels 32 and 33 are spaced longitudinally of the main. Rotation of shaft 88 in the proper direction will cause shaft 47 to thread downwardly in cap 45 thus camming pins 34 and 35, 37 and 38 radially outwardly so that the mandrels force the sleeve into sealing engagement with the front and rear edges of the openings 16 and 17. Rotation of shaft 58 in the proper direction will cause the nuts 71 and 75 to travel simultaneously downwardly on shafts 50 and 51 and nuts 61 and 76 to travel simultaneously upwardly on the said shafts. As nut 61, for example, moves upwardly, the upper end of link 66 will be cammed outwardly by the cam plates so that foot 67 will be forced outwardly. The lower end of the link 66 bears against web 31 and the link acts as a fulcrum for link 63 so that the latter's lower end, carrying the foot 64, is urged outwardly. All of the other presser feet are acting in the same manner and consequently springs 65 and 80 are bowed outwardly, thus curvilinearly distending the sleeve 39 between the edges of the mandrels 32 and 33. As this action continues, the lower ends, Figure 2, of the links as at 66 comes onto the inclined edges of the cam plates and eventually the linkages assume the relation shown in Figure 9 wherein the springs completely conform opposite portions of the rubber sleeve to the inner curvature of the main. It will be seen that pressure is distributed to the springs 65 and 80 through eight points of contact on each, these points being substantially evenly spaced from end to end of the springs. The opposed action of the top and bottom linkages keeps the springs in place. At any point in the operation where the ends of the springs might bend too close to the threaded shafts, the square nuts will be engaged by the spring ends so that the threads will not be fouled.

In their normal position, for example as shown in Figure 2, the linkage units are relatively straightened and extend generally longitudinally of the springs 65 and 80. As the nuts are moved together, the linkages are caused to buckle, thereby imparting thrust to the presser feet, this thrust becoming more powerful, like a toggle action, as the relation of Figure 9 is approached. It will be understood that the expanding action is essentially that of the links as at 63 and 66 and that the presser feet are provided for the purpose of more efficiently distributing the thrusts.

The links as at 66 are in effect levers of the third class with constantly moving fulcra. Link 66 for example, during the application of thrust, pivots about its connection with the presser foot 67 and fulcrums about its end 66'. The latter slides along web 31 and eventually comes onto the lower inclines of the wedge or cam plates 69 and 70 in order to maintain the proper rate of projection of the presser foot 67, thrust being substantially equalized between this foot and the foot 64.

When it is desired to remove the stopper, shafts 58 and 88 are reversely rotated and the stopper will resume its normal condition shown in Figures 2 and 5 as the rubber sleeve recovers its cylindrical form. The top nuts on rods 83 and 84 are now removed and by pulling upwardly on the cross head 85, the stopper is elevated into barrel 81 by shaft 58. The gate valve being now closed, the barrel and therewith the stopper can be removed. It will be understood that in setting up the apparatus, barrel 81 is secured in position on the gate valve housing after the barrel of the drilling machine has been removed. Then when the gate valve is opened, the stopper can be lowered to the position in Figures 2 and 5 by sliding shafts 58 and 88 downwardly to the position shown in Figures 1 and 4.

Assuming that main 15 is a twenty inch pipe, the apparatus will conform to a sixteen inch pipe, for example, in the manner shown in Figure 10. The conforming action is contributed largely by the terminal presser feet. It is contributed entirely by these terminal feet in the case of a twelve inch pipe as shown in Figure 11. In all cases a powerful and effective sealing action is assured. Regardless of the size of the main, the lateral openings are of constant size, for example eight and one-quarter inches in diameter for a stopper having an eight inch diameter.

In speaking of the sleeve material as "rubber," I mean any rubber or rubber composition, natural or artificial, such as will provide an expandible and recoverable casing and is adapted to make sealing contact with the inner pipe surfaces.

It will be understood that while I have described a preferred embodiment of the invention, the invention is by no means limited to this specific disclosure. Many variations are possible without departure from the scope of the invention as defined in the following claims.

I claim:

1. A pipe line stopper comprising a rubber sleeve, a pair of transversely arcuate mandrels extending longitudinally of the sleeve and disposed oppositely therein, means for moving said mandrels apart to distend the sleeve on one diameter, and means within the sleeve for expanding the sleeve laterally on longitudinally extending curves between the lateral edges of said mandrels.

2. A pipe line stopper comprising a rubber sleeve, a cylindrical core within said sleeve, said core having opposed longitudinally extending lateral slots, pressure members normally positioned wholly within said slots, means to project said members outwardly of the slots to conform the sleeve to the inner curvature of a main, mandrels carried by said core and extending longitudinally of the latter between said slots, and means for moving said mandrels apart.

3. A pipe line stopper comprising a rubber sleeve, and means for distending said sleeve comprising a plurality of linkage units within the sleeve, each of said units including a thrust member and a plurality of presser feet in pivotal connection with said thrust member, means for applying thrust to each thrust member to displace its associated presser feet, and an inclined surface associated with each unit for enforcing distending movement of the presser feet relative to said sleeve at points spaced longitudinally of the latter.

4. Structure according to claim 3 wherein a flat spring is provided within the sleeve and against which said feet bear, one only of said feet of each unit being secured to said spring.

5. A pipe line stopper comprising a rubber sleeve, and means for distending said sleeve comprising a plurality of linkages disposed within said sleeve, each of said linkages comprising a thrust member, a link pivoted intermediate its ends to one end of said thrust member, a second link pivoted intermediate its ends to one end of the first link, means for applying thrust to said thrust member, and means for guiding said second link so that one of its ends and the other end of the first link are urged toward the sleeve at points spaced longitudinally of the latter as the result of the thrust application.

6. Structure according to claim 5, wherein the guiding means includes a cam surface with which one end and then the other of said second link cooperates as thrust application continues.

7. A pipe line stopper comprising a rubber sleeve, and means for distending said sleeve comprising a pair of flat springs extending longitudinally within the sleeve against diametrically opposite wall portions of the sleeve, a pair of levers associated with each spring and having adjacent ends in connection with the springs, said levers normally extending generally longitudinally of their associated springs, means for swinging said levers simultaneously about their adjacent ends, and bearing surfaces along which the other ends of the levers slide during swinging, said surfaces being so arranged that said adjacent ends are caused to move outwardly during swinging thereby bowing the springs and distending the sleeve.

8. A pipe line stopper comprising a rubber sleeve, and means for distending said sleeve comprising a pair of flat springs extending longitudinally within the sleeve against diametrically opposite wall portions of the sleeve, a pair of linkage units within the sleeve associated with each spring, each of said units including a thrust member, a link pivoted between its ends to one end of said thrust member, a presser portion at one end of said link, a second link pivoted between its ends to the other end of the first link, a presser portion at one end of said second link, both of said presser portions of each unit bearing against one of said springs and the last named presser portion being secured to the spring, the units associated with each spring being opposed, means for applying thrust to the thrust members of the several units, and surfaces against which the other ends of said second links bear during the application of thrust whereby to project the presser portions outwardly to bow said springs and thereby distend said sleeve.

9. A pipe line stopper comprising a rubber sleeve, sectional mandrel means within said sleeve operable to distend said sleeve in a transverse plane, means within said sleeve operable to distend the sleeve on opposed longitudinally extending curves, and separate means for operating the two distending means independently.

10. A pipe line stopper comprising a rubber sleeve, sectional mandrel means within said sleeve operable to distend said sleeve in transverse planes adjacent its ends, means within said sleeve operable to distend the sleeve on opposed longitudinally extending curves, and separate means for operating the two distending means independently.

11. A pipe line stopper comprising a rubber sleeve, sectional mandrel means within said sleeve operable to distend said sleeve in a transverse plane, wedge means operable to expand said mandrel means, means within said sleeve operable to distend the sleeve on opposed longitudinally extending curves, and means for operating both of said operable means.

12. A pipe line stopper comprising a rubber sleeve, sectional mandrel means within said sleeve operable to distend said sleeve in transverse planes adjacent its ends, wedge means operable to expand said mandrel means, means within said sleeve operable to distend the sleeve on opposed longitudinally extending curves, and means for operating both of said operable means.

13. A pipe line stopper comprising a rubber sleeve insertable in diametrically extending relation through a side opening in a main, sectional mandrel means within said sleeve radially movable to distend said sleeve in a transverse zone whereby to form a seal at said opening, said sleeve including a portion adapted to form a seal with the main opposite said opening, and means within the sleeve operable to distend the sleeve on opposed longitudinally extending curves to form a seal with the main throughout between said opening and said portion.

14. A pipe line stopper comprising a rubber sleeve insertable in diametrically extending relation through opposed side openings in a main, sectional mandrel means within said sleeve radially movable to distend said sleeve in transverse zones adjacent its ends whereby to seal said openings, and means within said sleeve operable to distend the sleeve on opposed longitudinally extending curves to form a seal with the main throughout between said openings.

EARL E. CLINE.